INVENTOR.
HANS R ROTTMANN

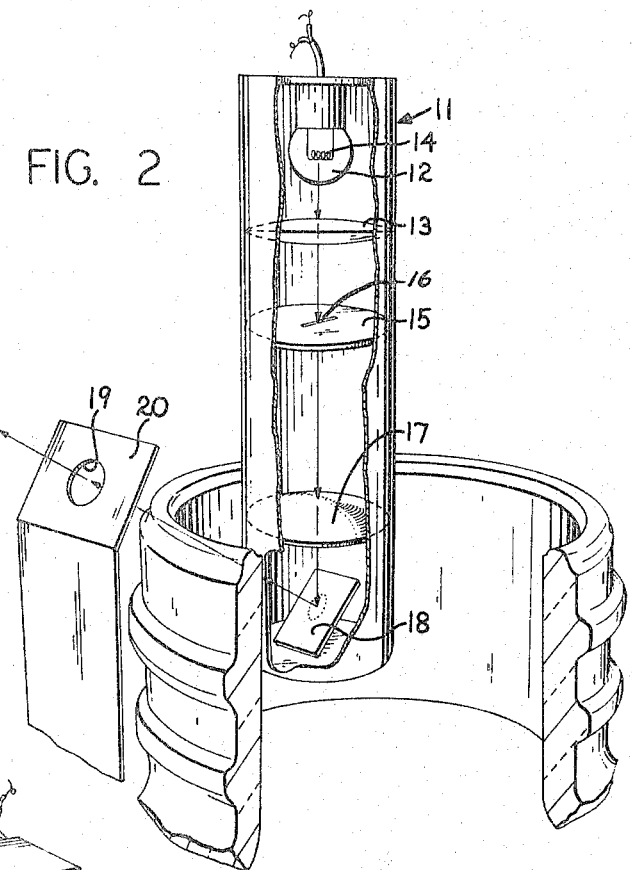

3,302,787
INSPECTING GLASS CONTAINERS FOR
LINE-OVER-FINISH DEFECTS
Hans R. Rottmann, Toledo, Ohio, assignor to Owens-Illinois, Inc., a corporation of Ohio
Filed Dec. 19, 1963, Ser. No. 331,743
1 Claim. (Cl. 209—111.7)

This invention relates to inspecting glass containers and particularly to inspecting the finish of glass containers for line-over-finish defects.

In the manufacture of hollow glass containers, a defect that sometimes occurs comprises an elongated line or groove in the top portion of the finish. Where the container is to be sealed by a cap that has a gasket which engages the top finish, such a line-over-finish defect prevents proper sealing with a resultant failure to preserve the products that are packaged in the container.

It is an object of this invention to provide a method and apparatus for inspecting hollow glass containers for line-over-finish defects in the top portion of the finish of glass containers.

It is a further object of the invention to provide such a method and apparatus which can be utilized with finishes that include sloping portions.

It is a further object of the invention to provide such a method and apparatus which is relatively insensitive to dirt and dust particles on the finish.

In the drawings:

FIG. 2 is a fragmentary part sectional perspective view of a portion of the apparatus shown in FIG. 1.

FIG. 3 is a diagrammatic perspective view of the portion of the apparatus shown in FIG. 2.

FIG. 4 is a fragmentary perspective view of a typical finish of a container which is to be inspected.

FIG. 5 is a diagrammatic perspective view of a modified form of apparatus.

Figure 1:
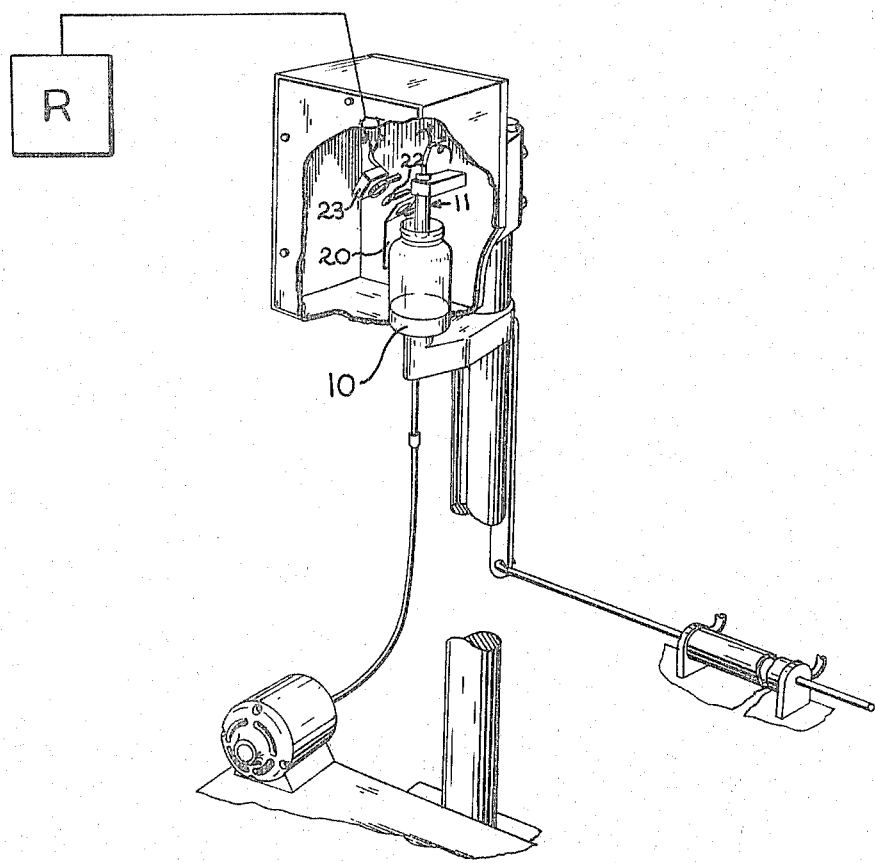
FIG. 1 is an assembly of an apparatus embodying the invention.

Referring to FIG. 4, the defect which is inspected in accordance with the invention comprises elongated grooves or lines D formed in the top portion of the finish F of the container. The finish F comprises a top sealing surface T and a tapered sloping surface S.

Referring to FIGS. 1 and 2, in accordance with the invention, the containers to be inspected are moved into and out of inspection position on a pad 10 by an apparatus such as shown in the patent to Fedorchak 2,682,802. At the inspection station, the pad 10 is elevated and rotated to bring the container into inspection position.

At the inspection station, a light beam is directed upwardly and outwardly by a light source 11 in a generally radial plane at an acute angle to the horizontal and focused in a spot in the rim of the container. Light source 11 comprises a light bulb 12 and lens 13 that focus an image of the filament 14 of the light bulb on a mask 15. The image of the filament passes through an elongated aperture 16 of the mask. A portion of this image passing through aperture 16 is focused by a lens 17 in an ensmalled image of the aperture 16 in the finish of the container after being reflected by a mirror 18 which is at an angle to the horizontal such that the light beam is directed upwardly and outwardly. The beam, after passing through the finish of the container, passes through an aperture 19 of a mask 20 onto a mask 21 mounted on a lens 22. A light sensitive cell 23 is provided behind the lens 22 and the mask 21.

The spot or image of the aperture 16 which is focused on the finish of the container is elongated in a direction radially of the container and illuminates substantially only the top surface T and the sloping surface S of the finish F. The positioning of the lens 17 with respect to the mask 15 and the finish F is such that the image of the aperture 16 in the finish of the container is smaller in dimensions than the aperture 16. In this fashion, a more concentrated image is focused on the specific area which is to be inspected. Since the aperture 16 is larger than the resultant image in the finish F, there is less likelihood of dust or dirt obstructing the aperture. Further, the filament 14 can be made larger and more sturdy, even though the image focused in the finish F is small, thereby permitting a bulb 12 to be used that has a longer life and a greater light output. The mask 20 lessens the possibility of extraneous light affecting the cell 23 and thereby increases the noise-to-signal ratio.

In operation, when a container is elevated into position and then rotated, the rotation of the container causes the beam to scan the top portion of the finish of the container. If a line-over-finish defect is present, it deflects a portion of the light beam by a refraction out of the normal path beyond the periphery of the mask 21 to energize the light sensitive means 23. This produces a reject signal which is utilized to actuate a reject mechanism R at a position beyond the inspection station (FIG. 1). If no defect is present, the light emerging from the finish F will fall on the mask 21.

Since the light beam is passing upwardly and outwardly and strikes the defect from the interior, there is less likelihood of a false signal because of dirt or other particles on the rim of the container. In addition, since the beam is inclined upwardly and outwardly, and the light reaching the outer surfaces S and T comes from within the glass, any totally reflected light, such as from surface T will not emerge from the finish in the area observed by the photodetector. Light emerging from the surface S, without a defect being present, will be undeflected and thus strike the mask 21. However, the presence of a defect in the outer surfaces S and T will upset this condition and cause the light to emerge by refraction at an angle such that the unmasked portion of the lens 22 will receive light and in turn focus this light on the photodetector.

In the form of the invention shown in FIG. 5, the mask 21' is placed directly over a solar cell 23' and solar cell 23' may be positioned in close proximity to the finish F. If a line-over-finish defect is present, the light beam is deflected beyond the periphery of mask 21' to energize cell 23' and activate the reject mechanism R.

I claim:

An apparatus for inspecting a glass container for line-over-finish defects in the top portion of the finish which comprises means for directing a beam of light downwardly, a mask having an elongated aperture, means for focusing said light beam in an elongated spot overlying said aperture, means for redirecting and focusing an image of the aperture into a beam which extends upwardly from within the container and radially outwardly and is focused into an image of the aperture in the finish that extends generally radially, means for causing relative rotation between said beam and said container, light sensitive means positioned exteriorly of the container with its line of vision in the normal path of the light beam through said finish, A mask positioned between said finish and said light sensitive means in the normal path of said beam whereby said light sensitive means is energized by deflection of the light beam by a line-over-finish defect beyond the periphery of said mask, means responsive to energization of said light sensitive means for creating a reject signal, and means for rejecting a container in response to said reject signal.

References Cited by the Examiner
UNITED STATES PATENTS

| | | | |
|---|---|---|---|
| 2,502,503 | 4/1950 | Berkley | 250—224 X |
| 2,735,331 | 2/1956 | McMaster. | |
| 2,750,519 | 6/1956 | Summerhayes | 209—111.7 X |
| 3,027,798 | 5/1962 | Mathias. | |
| 3,150,266 | 9/1964 | Mathias | 250—224 |
| 3,235,739 | 2/1966 | Rottmann | 209—111.5 |

M. HENSON WOOD, Jr., *Primary Examiner.*

J. N. ERLICH, *Assistant Examiner.*